July 29, 1952  J. T. WELSH  2,604,798
POWER TRANSMISSION UNIT WITH FEED-BACK TO VARY THE GEAR RATIO
Filed July 28, 1949  4 Sheets-Sheet 2

INVENTOR.
JOHN T. WELSH
BY Kenyon and Kenyon
HIS ATTORNEYS

July 29, 1952     J. T. WELSH     2,604,798
POWER TRANSMISSION UNIT WITH FEED-BACK TO VARY THE GEAR RATIO
Filed July 28, 1949     4 Sheets-Sheet 3
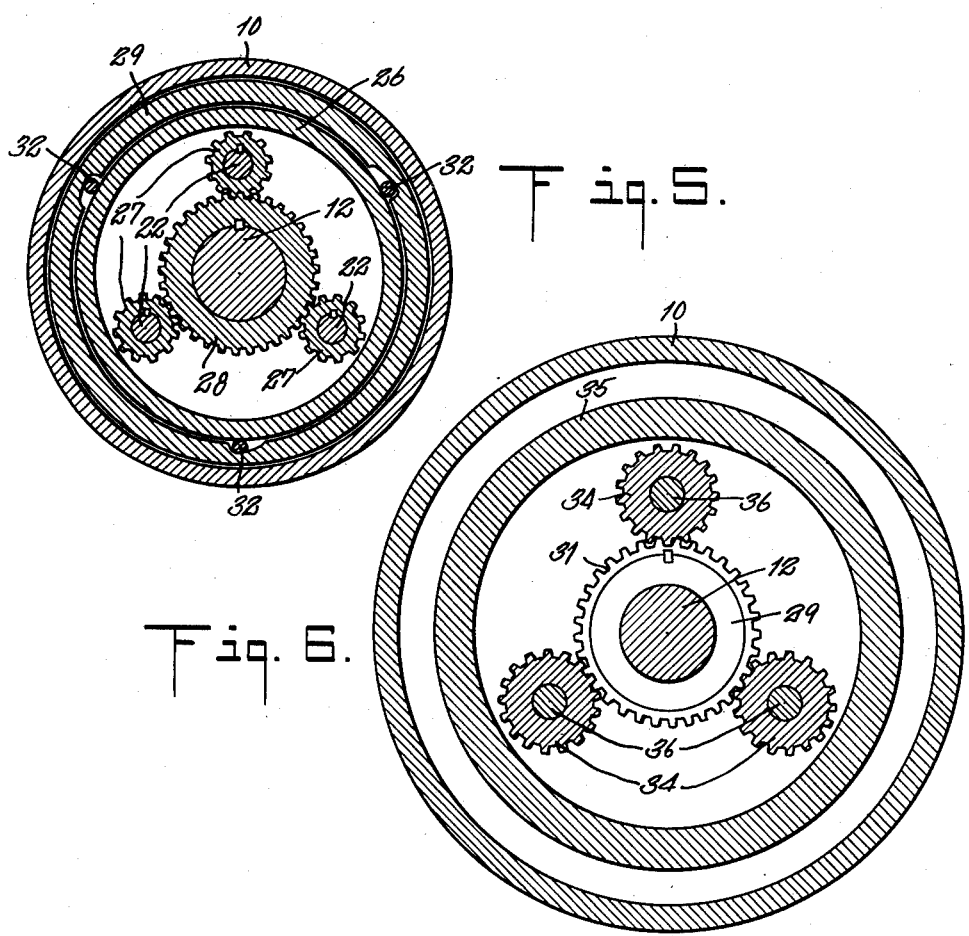
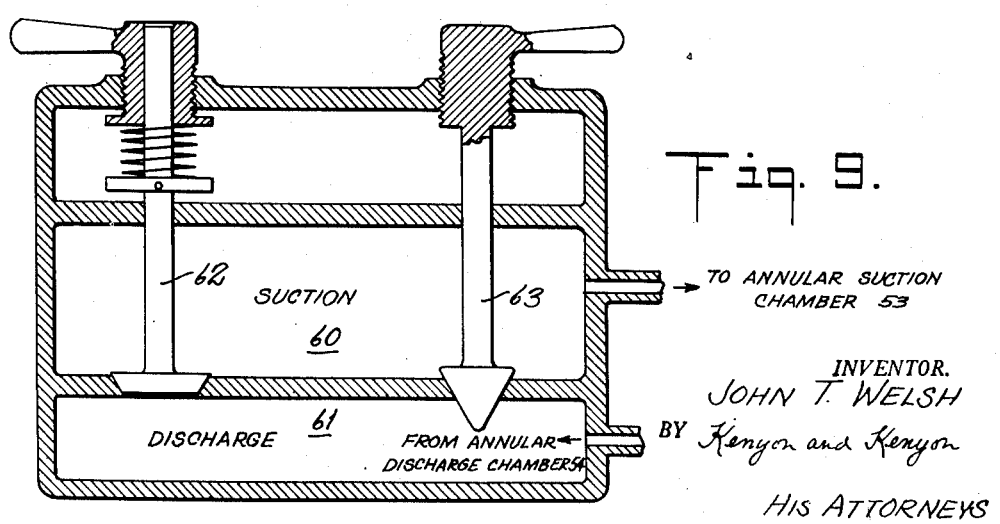
INVENTOR.
JOHN T. WELSH
BY Kenyon and Kenyon
HIS ATTORNEYS July 29, 1952 J. T. WELSH 2,604,798
POWER TRANSMISSION UNIT WITH FEED-BACK TO VARY THE GEAR RATIO
Filed July 28, 1949 4 Sheets-Sheet 4

INVENTOR.
JOHN T. WELSH
BY Kenyon and Kenyon
HIS ATTORNEYS

UNITED STATES PATENT OFFICE 2,604,798

POWER TRANSMISSION UNIT WITH FEED-BACK TO VARY THE GEAR RATIO

John T. Welsh, Highland Park, N. J.; Alrena L. Welsh, Highland Park, N. J., executrix of said John T. Welsh, deceased Application July 28, 1949, Serial No. 107,261

10 Claims. (Cl. 74—763)

This invention relates to a power transmission unit and more particularly to a power transmission unit wherein a feed-back device is utilized to vary the gear ratio of the gearing of the unit automatically as the speed of the driven shaft changes due to changes in torque.

Many transmission units are known to those skilled in the art whereby power delivered from one machine at a certain speed or number of revolutions per minute is converted into power at another speed or number of revolutions per minute. Since power is proportional to speed multiplicated by torque, it follows that for a given power output or input that as the speed is changed, the torque also will be proportionally changed. Transmission units are used in many applications, but chiefly for the reduction of speed and increase of torque. Examples of applications of this kind are in the driving of hoists, presses, steamships, automobiles, motorboats, etc. In many of the practical applications of machines of this kind, the multiplication of torque and corresponding reduction of speed will be as great as five hundred times. Known transmission units, however, are subject to the difficulty that their gear ratio after design is fixed and hence not subject to change during operation. Various applications of transmission units, as for example automobiles in the process of attaining a given speed, can utilize to great advantage a variable gear ratio such that the transmission unit initially delivers a high starting torque to the driven shaft while bringing it up to the speed of the driving shaft, thereafter, as the speed of the driven shaft increases, this torque and the gear ratio of the unit being gradually reduced until finally the driving and driven shaft are rotating at the same speed and the gear ratio of the unit is 1:1. From the fundamental power-torque-speed equation it also follows that if the running-speed load torque on the driven shaft exceeds that of the driving shaft, a torque and corresponding speed will automatically be delivered to the driven shaft corresponding to the full horse power available at the driving shaft minus the small frictional loss in the unit.

Accordingly, the principal object of this invention is to provide a power transmission unit in which the gear ratio is automatically changed as the speed of the driven shaft varies.

Another object of this invention is to provide such a transmission unit wherein a feed-back mechanism is utilized to vary the gear ratio of the gearing of the unit automatically as the speed of the driven shaft changes.

Another object of this invention is to provide such a transmission unit in which a hydraulic resistive abutment may be utilized to control the feed-back mechanism.

Still another object of this invention is to provide such a transmission unit in which a high speed pinion on the driving shaft meshes with a series of idler gears on a rotary disc rotating concentrically with the driving and the driven shaft, said idler gears meshing additionally with an internally toothed gear which constitutes a part of the speed-change gearing.

Other and further objects will appear during the course of the following description when taken with the accompanying drawings in which:

Fig. 1 is a partially cross-sectional view of a transmission unit embodying this invention;

Figs. 2, 3, 4, 5, and 6 are cross-sectional views along planes II—II, III—III, IV—IV, V—V, and VI—VI, respectively, of Fig. 1;

Fig. 9 is a cross-sectional view of the control chambers for the radial pump assembly of Fig. 7.

Briefly, the exemplified transmission units embodying this invention comprise a housing 10 having driving and driven shafts 11 and 12, respectively, journaled in opposite ends thereof. Within the housing 10 is contained a speed-change gearing, which mechanically links driving shaft 11 and driven shaft 12, and in addition a feed-back mechanism between driven shaft 12 and the speed-change gearing to vary its gear ratio as the speed of driven shaft 12 changes.

Description

Figure 1:
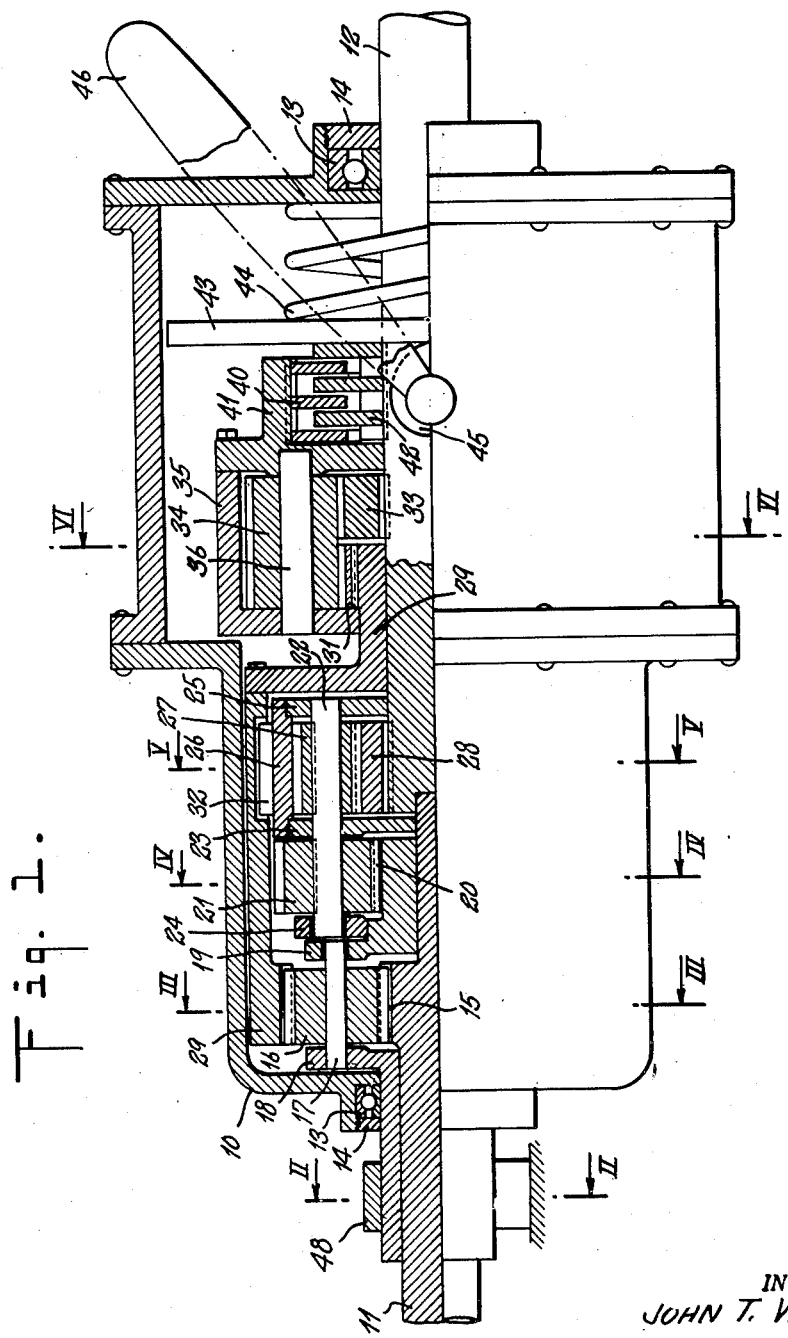

Referring now to the drawings, and more particularly to Fig. 1, driving shaft 11 and driven shaft 12 are shown in axial alignment, and with the end of the driving shaft 11 adjacent driven shaft 12 reduced in diameter to fit within a corresponding aperture formed in the end of shaft 12. Housing 10, which is of split construction as shown for ease of assembly of the unit and fastened together by any suitable means such as bolts or rivets, is journaled and provided with a bearing 13 and sealing ring 14 at each of its opposite ends for the reception of shafts 11 and 12 respectively. Driving shaft 11 has formed upon it at 15 a pinion or sun gear which meshes with three idler or planet gears 16, only one of which is visible in Fig. 1. Each planet gear 16 is free to rotate upon its shaft or pin 17, the ends of each shaft 17 fitting in corresponding apertures provided in discs or carriers 18 and 19. Discs 18 and 19 are free to rotate upon shaft 11 and each is provided with an extended hub portion, these portions extending in opposite directions. The hub portion of disc 19 extends toward driven or output shaft 12 and has formed upon it another pinion or sun gear 20 as shown. Pinion 20 meshes with a second set of three idler or planet gears 21, again only one being visible in Fig. 1, and each gear 21 is secured to its shaft 22 as by keying. Each shaft 22 is rotatably secured at its center and two ends within corresponding apertures formed in three discs or carriers 23, 24, and 25, respectively, disc 23 being rotatable upon the reduced diameter portion of shaft 11, disc 24 being rotatable upon the extended hub portion of disc 19, and disc 25 being rotatable upon output shaft 12. To give added rigidity to the structure, an outer ring 26 is provided, as shown, between and secured to discs 23 and 25 by any suitable means. Each gear 21 is disposed on its shaft 22 between discs 23 and 24, and on each shaft 22 between discs 23 and 25 is additionally provided another idler or planet gear 27 which is secured to shaft 22, as by keying. On the end of driven shaft 12 adjacent shaft 11 is secured, as by keying, a pinion or sun gear 28 which meshes with each idler or planet gear 27.

Feed-back member 29 is generally cup-shaped and internally toothed at its larger open end to mesh with gears 16. An extended hub is formed at the other end of member 29 and a pinion or sun gear 31 is secured, as by keying, to the external surface of the free end of this extended hub. An over-running clutch is provided between feed-back member 29 and ring 26 in the form of a plurality of rollers 32 (only one is shown in Fig. 1), positioned in corresponding recesses formed in the interior of member 29 adjacent ring 26, as is shown more clearly in Fig. 5. These recesses are formed in the conventional manner so that member 29 is engaged with ring 26 when the transmission unit is operating in the "forward" direction, and disengaged from ring 26 in the "reverse" direction.

A pinion or sun gear 33 is secured, as by keying, to driven shaft 12 adjacent pinion 31 and both pinions 31 and 33 mesh with three idler or planet gears 34, only one of which is shown in Fig. 1. A carrier in the form of a cage member 35 enclosing idler gears 34 and pinions 31 and 33 is provided which is free to rotate upon the extended hub of feed-back member 29 and driven shaft 12 as shown. Apertures are provided in the walls of cage member 35 to receive the pins or shafts 36 of idler gears 34, and a clutch of the pressure plate type is provided between cage member 35 and driven or output shaft 12.

This pressure plate clutch includes a plurality of outer friction discs 40 which are restrained from rotating relative to cage member 35 by one or more keys or projections in the outwardly extending sleeve 41 which may be integral with cage member 35. A corresponding plurality of inner friction discs 42 are provided as shown and restrained from rotary motion relative to shaft 12 but which similarly can move axially along the key or projection shown of shaft 12. A clutch or push plate 43 is biased by means of helical spring 44 so as normally to force the inner friction discs 42 and the outer friction discs 40 together.

The axial position of push plate 43 is also controlled by cam 45 and operating handle 46, which are connected by a shaft journaled in housing 10. When operating handle 46 is in the right-hand position as shown, the friction discs of the clutch are disengaged. When handle 46 is thrown to the left to the position indicated by the dotted lines, the full designed spring pressure is exerted on the push plate 43 and hence the friction discs are engaged. At intermediate positions of the operating handle 46, a proportionate spring pressure is exerted on push plate 43.

The extended hub portion of disc 18 surrounds and is journaled on driving shaft 11 and extends through the central opening in the end of housing 10 as shown. As illustrated more clearly in Fig. 2, which is a cross-sectional view along plane II—II of Fig. 1, a brake band 48 is wrapped around a portion of the hub of disc 18 which extends outside of the housing, and this band 48 is spring-loaded under control of an operating handle 49 in order to hold disc 18 fixed and immovable when "reverse" operation of the transmission unit is desired.

Figure 3:
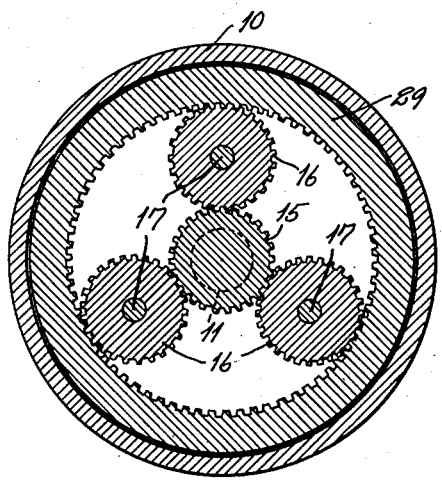

In Fig. 3 is shown a cross-sectional view along plane III—III of Fig. 1 to demonstrate the manner in which the pinion or sun gear 15 on shaft 11 meshes with idler or planet gears 16, each of which is freely rotatable upon its shaft 17. As illustrated, each idler gear 16 also meshes with the internal teeth of feed-back mechanism 29, and housing 10 surrounds and seals the entire unit.

Figure 4:
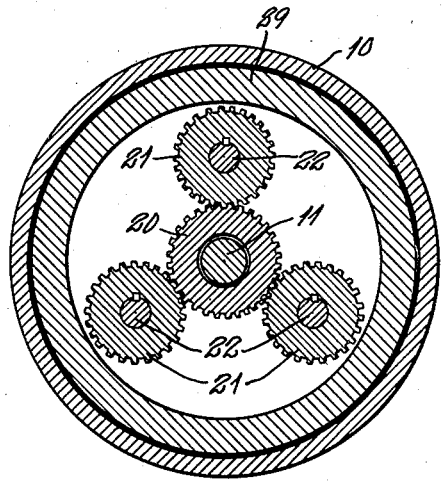

In Fig. 4 is shown a cross-sectional view along plane IV—IV of Fig. 1 to demonstrate the manner in which pinion or sun gear 20, which is freely rotatable upon shaft 11, meshes with the three idler or planet gears 21, each of which is secured by means of its key shown to its respective shaft 22.

Fig. 5 is a cross-sectional view along plane V—V of Fig. 1, and here is illustrated the manner in which each shaft 22 transmits motion to its corresponding idler or planet gear 27 due to the key shown, each idler gear 27 meshing with pinion or sun gear 28, which is also keyed to driven shaft 12 in order to transmit power thereto. Note again the over-running clutch including the rollers 32 which engage feed-back member 29 with ring 26 when the transmission unit is being operated in the "forward" direction.

Fig. 6 is a cross-sectional view along plane VI—VI of Fig. 1, and here is illustrated the manner in which the extended hub of feed-back member 29 is keyed to pinion 31 and the manner in which pinion or sun gear 31 meshes with the three idler or planet gears 34, whose shafts 36 are journaled in the walls of cage member 35.

Operation

Figure 2:
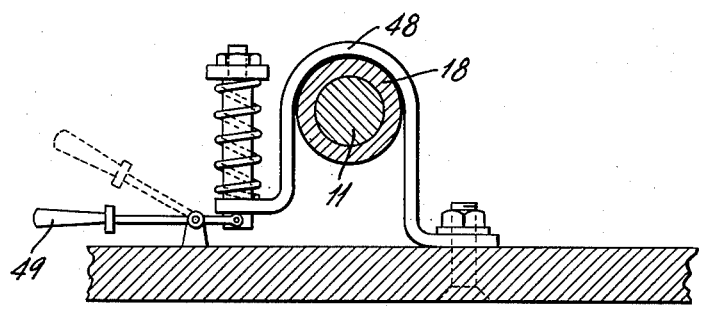

Assume that driven shaft 12 is at a standstill under load and power is suddenly applied to driving shaft 11 by means of a clutch (not shown) to produce "forward" operation of the transmission unit, i. e., reverse operating handle 49 is in its downward position (Fig. 2). Assuming additionally that driving shaft 11 then rotates clockwise in Figs. 2, 3, and 4, and that pressure plate clutch operating handle 46 (Fig. 1) is in its right-hand position as shown, shafts 17 remain stationary, gears 16 rotate counter-clockwise upon their shafts 17, and feed-back member 29 rotates counter-clockwise (Figs. 3, 4, and 5) due to the well-known planetary gear action and the lack of restraint between feed-back member 29 and any fixed body. As shown in Fig. 6, this counter-clockwise rotation of feed-back member 29 and the attached pinion 31 cause idler gears 34 to rotate clockwise and shafts 36 and cage member 35 to revolve clockwise about the longitudinal axis of the unit, since pinion 33 (Fig. 1) is held fixed inasmuch as it has been assumed that it is under load conditions. This is the "forward" idling position of the unit with no torque or power transmitted to gear 28 or output shaft 12.

If, now, the operating handle 46 of the pressure plate clutch is moved slightly to the left from the position shown in Fig. 1, the clockwise movement of cage member 35 relative to output shaft 12 begins to be restrained, and hence the counter-clockwise rotation of feed-back member 29 and pinion 31 are similarly restrained, causing shafts 17 (Fig. 3) to begin to revolve clockwise. Since shafts 17 are journaled in disc 19 upon which is integrally formed pinion 20, the latter begins to rotate clockwise also (Fig. 4). When pinion 20 rotates clockwise, idler gears 21 rotate counter-clockwise and their shafts 22 revolve counter-clockwise around the longitudinal axis of the unit. The reason that shafts 22 revolve is because shaft 12 and gear 28 keyed thereto (Fig. 5) are at a standstill, as assumed above, and gears 27 are keyed to shafts 22 and hence move in the same direction as gears 21 (Fig. 4). The counter-clockwise revolution of shafts 22 cause ring 26 of the carrier in which shafts 22 are journaled to rotate counter-clockwise also (Fig. 5).

As the restraint of the movement of cage member 35 relative to output shaft 12 is increased, as by moving operating handle 46 (Fig. 1) further to the left, the speed of counter-clockwise rotation of feed-back member 29 (Figs. 3, 4, and 5) will decrease, and the speed of counter-clockwise rotation of ring 26 will increase until these speeds are equal. As the restraint of the movement of cage member 35 relative to output shaft 12 is further increased, ring 26 and feed-back member 29 become locked together due to the overrunning clutch, including rollers 32 (Fig. 5), and will rotate at the same speed.

Ring 26 is thus restrained relative to output shaft 12 through feed-back member 29, cage member 35, and the pressure plate clutch. This restraint of ring 26 causes shafts 22 (Figs. 4 and 5) to slow down their counter-clockwise revolution and power begins to be transmitted to pinion 28 and output shaft 12 through idler gears 21 and 27.

Pinion 28 (Fig. 5) and output shaft 12 thus start to rotate clockwise, the latter carrying with it the plate clutch assembly, and hence causing feed-back member 29 and ring 26 to begin to rotate clockwise about the axis of the unit, although they still have a counterclockwise movement relative to the movement of shaft 12 until the transmission unit comes up to full speed. At full speed the entire unit rotates, and a direct drive, or 1:1 gear ratio is obtained. The full speed condition will, of course, be obtained only if the load torque is not greater than the driving torque applied to the transmission unit. If the load torque is greater, a gear ratio will obtain in the transmission unit such that the driving torque times the gear ratio will be equal to the load torque in accordance with the well-known torque speed equations.

For reverse operation of the unit, operating handle 49 (Fig. 1) is moved upward to the position indicated by the dotted line to restrain cage 18 from rotating. Since shafts 17 are journaled in cage 18, this prevents any revolution of shafts 17 about the longitudinal axis of the unit, and hence clockwise movement of driven shaft 11 (Fig. 1) causes idler or planet gears 16 to rotate counterclockwise and hence feed-back member 29 also to rotate counter-clockwise. Counter-clockwise rotation of feed-back member 29 causes counter-clockwise rotation of pinion 31 (Fig. 6) and clockwise rotation of idler or planet gears 34, together with clockwise revolution of shafts 36 and rotation of cage member 35 if operating handle 46 (Fig. 1) of the pressure plate clutch is in the right-hand position shown. This is also an idling position of the unit with no power or torque transmitted to output shaft 12. If now, however, operating handle 46 is moved to the left to restrain the movement of cage member 35 relative to output or driven shaft 12, power begins to be transmitted from pinion 31 through idler or planet gears 34, and hence pinion 33 and output shaft 12 keyed thereto begin to rotate in a counter-clockwise or reverse direction with a speed reduction controlled primarily by the gear ratio of pinion 15 and the ring gear formed on the inner surface of feed-back member 29. However, since shafts 36 can revolve counter-clockwise with output shaft 12, depending upon the amount of restraint or slippage of the clutch between cage member 35 and output shaft 12, this may also increase the "reverse" operation gear ratio. It is to be noted that during this reverse operation, ring 26 rotates and shafts 22 revolve clockwise (Fig. 5) about the longitudinal axis of the unit, and idler gears 21 and 27 rotate clockwise since pinion 20 (Figs. 1 and 4) is held fixed. This movement of ring 26, shafts 22, and idler gears 21 and 27 does not transmit power through the unit but merely is an "idle" rotation of these members.

Alternative embodiment

Figure 7:
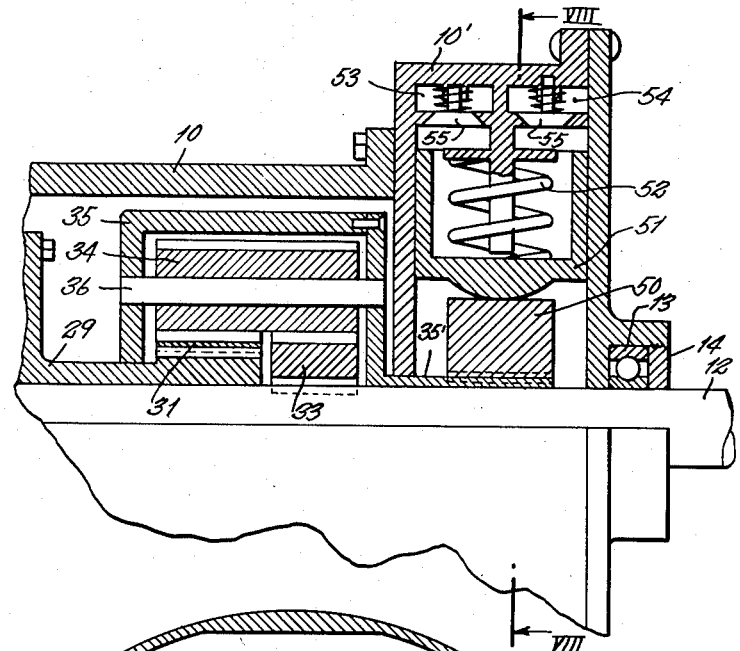
Fig. 7 is a partially cross-sectional view of a hydraulic abutment in the form of a radial pump assembly utilized in place of the pressure plate clutch of Fig. 1.
Figure 8:
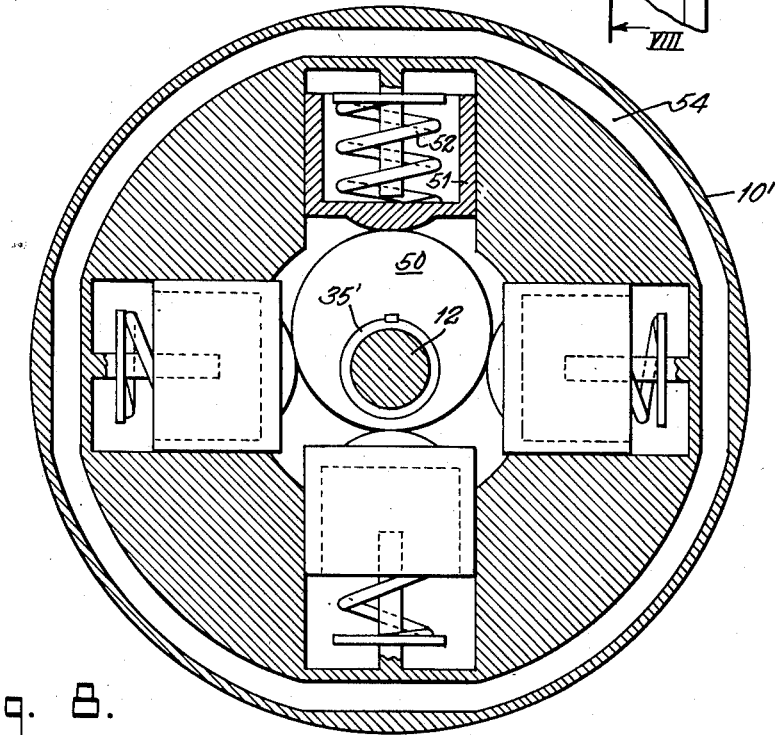
Fig. 8 is a cross-sectional view along plane VIII—VIII of Fig. 7.

For heavy duty use it may be desirable to replace the pressure plate clutch with a more efficient device which is not subject to friction and hence wear. This may take the form of a hydraulic abutment, and in Fig. 7 is shown a cross-sectional view of the portions of the transmission unit of Fig. 1 necessary to illustrate the replacement of the pressure plate type clutch by a hydraulic abutment in the form of a radial pump. Cage member 35 no longer has the integral outwardly extending sleeve 41 of Fig. 1 but instead is provided with an outwardly extending hub portion 35', as shown, on whose outer periphery is secured, as by keying, a cam 50, as best seen in Fig. 8 which is a cross-sectional view along plane VIII—VIII of Fig. 7. Cam 50 actuates a plurality of radial pistons or plungers 51, only one of which is shown in Fig. 7, and these plungers are each spring loaded by means of a helical spring 52 so as to bear against cam 50. Each radial plunger fits slidably within a corresponding cylinder formed in the pump body 10' which is secured to and forms a part of housing 10. Around the body 10' and adjacent the perimeter thereof are two separate circumferential annular passages 53 and 54 which are the suction and discharge passages, respectively. A spring-loaded check valve 55 is provided between the upper or closed end of each cylinder and each passage 53 and 54 so that as each plunger 51 moves downward (Fig. 7) the hydraulic fluid is sucked out of suction passage 53 but no fluid flow can occur from discharge passage 54, and conversely, when plunger 51 is being forced upward (Fig. 7) by cam 50, the hydraulic fluid flows into discharge passage 54 but cannot flow into suction passage 53. As will be apparent to those skilled in the art, while four plungers 51 are shown in Fig. 8, any desired number may be employed, and the cam 50 actuates each plunger 51 in its compression stroke while each plunger or piston 51 is actuated through its suction stroke by its respective spring 52. The annular chambers 53 and 54 are common to all the radial cylinders, as described above, and each is connected to its corresponding control chamber shown in Fig. 9. As there shown, two valves are provided between suction chamber 60 and discharge chamber 61, a relief valve 62 between discharge chamber 61 and suction chamber 60 which is adjustable and designed to be set at a pressure which will not allow the torque on driven shaft 12 to stall the driving shaft 11, and a needle valve 63 to regulate the speed of the driven shaft 12. When needle valve 63 is moved to its fully open position, so that there is free passage of fluid between suction chamber 60 and discharge chamber 61, the transmission unit will idle; this corresponds to the operation of the unit of Fig. 1 when operating handle 46 of the pressure plate clutch is in the right-hand position shown. When needle valve 63 is fully closed, the transmission unit will operate to deliver full driving torque to the output shaft 12, as controlled by adjustable relief valve 62. At intermediate adjustments of the needle valve 63, cage member 35 will rotate at intermediate speeds and thus produce variable speeds of driven shaft 12 different from the speed of input or driving shaft 11. It is to be noted that in this particular embodiment of Fig. 7 the controlled restraint of cage member 35 is between the latter and housing 10, which is assumedly fixed, whereas in the embodiment of Fig. 1 the restraint was between cage member 35 and driven shaft 12. The operation of the two units, however, is substantially similar and will be apparent to those skilled in the art, and hence will not be described here in detail. However, if it is desired for any reason, radial pump body 10' can be keyed to driven shaft 12, and then the restraint of this particular transmission unit will be between cage member 35 and driven shaft 12 as in the embodiment of Fig. 1. Conversely, if it is desired, the restraint of the embodiment of Fig. 1 might also be made between cage member 35 and a fixed body, preferably housing 10, by connecting the key restraining radial movement of inner friction discs 42 to housing 10 rather than to output or driven shaft 12.

It may also be pointed out that, if desired, cage member 35 may be omitted from the embodiments of Figs. 1 and 7 if the restraint is between the speed-change mechanism and output or driven shaft 12 rather than between the former and a fixed body, such as housing 10. Pinions 31 and 33, as well as idler or planet gears 34, would then also be omitted and, in the case of the embodiment of Fig. 1, the outer friction discs 40 of the pressure plate clutch would then be secured to a suitable extending sleeve formed on feed-back member 29. Similarly, in the embodiment of Fig. 7, cam 50 would be secured to the extended hub portion of feed-back member 29 in place of pinion 31.

Numerous additional applications of the above-disclosed principles will occur to those skilled in the art and no attempt has been made to exhaust such possibilities. The scope of my invention is defined in the following claims.

What I claim is:

1. A transmission unit with feed-back to vary the gear ratio comprising a driving shaft and an abutting coaxial driven shaft, said driving shaft including a pinion adjacent its end adjacent said driven shaft, first and second carriers rotatably mounted on said driving shaft on opposite sides of said pinion, said first carrier being positioned between said pinion and said end of said driving shaft adjacent said driven shaft and having a hub extending away from said pinion and a pinion formed on said hub, a first idler gear rotatably mounted on said first and second carriers and meshing with said driving shaft pinion, a brake adjustable to engage said second carrier, a third carrier positioned between said first carrier and said end of said driving shaft adjacent said driven shaft and rotatable on said driving shaft, a pin rotatable in and carried by said third carrier, second and third idler gears secured on said pin, said second idler gear meshing with said first carrier pinion, a pinion secured to said driven shaft and meshing with said third idler gear, a cage member enclosing said first and third carriers and having an internally-toothed gear meshing with said first idler gear, an over-running clutch between said cage member and said third carrier, and an adjustable restraining clutch member between said cage member and said driven shaft.

2. A transmission unit with feed-back to vary the gear ratio comprising a housing, a driving shaft and an abutting coaxial driven shaft journaled respectively in opposite ends of said housing, said driving shaft including a pinion adjacent its end adjacent said driven shaft, first and second carriers rotatably mounted on said driving shaft on opposite sides of said pinion, said first carrier being positioned between said pinion and said end of said driving shaft adjacent said driven shaft and having a hub extending away from said pinion and a pinion formed on said hub, a first idler gear rotatably mounted on said first and second carriers and meshing with said driving shaft pinion, a brake adjustable to engage said second carrier, a third carrier positioned between said first carrier and said end of said driving shaft adjacent said driven shaft and rotatable on said driving shaft, a pin rotatable in and carried by said third carrier, second and third idler gears secured on said pin, said second idler gear meshing with said first carrier pinion, a pinion secured to said driven shaft and meshing with said third idler gear, a cage member enclosing said first and third carriers and having an internally-toothed gear meshing with said first idler gear, an over-running clutch between said cage member and said third carrier, and an adjustable restraining brake member between said cage member and said housing.

3. A transmission unit with feed-back to vary the gear ratio comprising a housing, a driving shaft and an abutting coaxial driven shaft journaled respectively in opposite ends of said housing, said driving shaft including a pinion adjacent its end adjacent said driven shaft, first and second carriers rotatably mounted on said driving shaft on opposite sides of said pinion, said first carrier being positioned between said pinion and said end of said driving shaft adjacent said driven shaft and having a hub extending away from said pinion and a pinion formed on said hub, a first idler gear rotatably mounted on said first and second carriers and meshing with said driving shaft pinion, a brake adjustable to engage said second carrier, a third carrier positioned between said first carrier and said end of said driving shaft adjacent said driven shaft and rotatable on said driving shaft, a pin rotatable in and carried by said third carrier, second and third idler gears secured on said pin, said second idler gear meshing with said first carrier pinion, a pinion secured to said driven shaft and meshing with said third idler gear, a first cage member enclosing said first and third carriers and having at one end an internally-toothed gear meshing with said first idler gear and rotatably mounted at its other end on said driven shaft, an over-running clutch between said first cage member and said third carrier, a pinion secured on said other end of said first cage member, a corresponding abutting pinion secured to said driven shaft, a second cage member enclosing said two last-mentioned pinions, an idler gear rotatably mounted in said second cage member and meshing with both said two last-mentioned pinions, and an adjustable restraining brake member between said second cage member and said housing.

4. A transmission unit with feed-back to vary the gear ratio comprising a driving shaft and an abutting coaxial driven shaft, said driving shaft including a pinion adjacent its end adjacent said driven shaft, a first carrier rotatably mounted on said driving shaft between said pinion and said end of said driving shaft adjacent said driven shaft, said first carrier having a hub extending away from said pinion and a pinion formed on said hub, a first idler gear rotatably mounted on said first carrier and meshing with said driving shaft pinion, a second carrier positioned between said first carrier and said end of said driving shaft adjacent said driven shaft and rotatable on said driving shaft, a pin rotatable in and carried by said second carrier, second and third idler gears secured on said pin, said second idler gear meshing with said first carrier pinion, a pinion secured to said driven shaft and meshing with said third idler gear, a cage member having an internally-toothed gear meshing with said first idler gear, a mechanical connection between and adapted to secure said cage member to said second carrier, and an adjustable restraining clutch member between said cage member and said driven shaft.

5. A transmission unit with feed-back to vary the gear ratio comprising a housing, a driving shaft and an abutting coaxial driven shaft journaled respectively in opposite ends of said housing, said driving shaft including a pinion adjacent its end adjacent said driven shaft, a first carrier rotatably mounted on said driving shaft between said pinion and said end of said driving shaft adjacent said driven shaft, said first carrier having a hub extending away from said pinion and a pinion formed on said hub, a first idler gear rotatably mountde on said first carrier and meshing with said driving shaft pinion, a second carrier positioned between said first carrier and said end of said driving shaft adjacent said driven shaft and rotatable on said driving shaft, a pin rotatable in and carried by said second carrier, second and third idler gears secured on said pin, said second idler gear meshing with said first carrier pinion, a pinion secured to said driven shaft and meshing with said third idler gear, a cage member having an internally-toothed gear meshing with said first idler gear, a mechanical connection between and adapted to secure said cage member to said second carrier, and an adjustable restraining brake member between said cage member and said housing.

6. A transmission unit with feed-back to vary the gear ratio comprising a housing, a driving shaft and an abutting coaxial driven shaft journaled respectively in opposite ends of said housing, said driving shaft including a pinion adjacent its end adjacent said driven shaft, a first carrier rotatably mounted on said driving shaft between said pinion and said end of said driving shaft adjacent said driven shaft, said first carrier having a hub extending away from said pinion and a pinion formed on said hub, a first idler gear rotatably mounted on said first carrier and meshing with said driving shaft pinion, a second carrier positioned between said first carrier and said end of said driving shaft adjacent said driven shaft and rotatable on said driving shaft, a pin rotatable in and carried by said second carrier, second and third idler gears secured on said pin, said second idler gear meshing with said first carrier pinion, a pinion secured to said driven shaft and meshing with said third idler gear, a first cage member enclosing said first carrier and having at one end an internally-toothed gear meshing with said first idler gear and rotatably mounted at its other end on said driven shaft, a mechanical connection between and adapted to secure said first cage member to said second carrier, a pinion secured on said other end of said first cage member, a corresponding abutting pinion secured to said driven shaft, a second cage member enclosing said two last-mentioned pinions, an idler gear rotatably mounted in said second cage member and meshing with both said two last-mentioned pinions, and an adjustable restraining brake member between said second cage member and said housing.

7. A transmission unit with feed-back to vary the gear ratio comprising a driving shaft and an abutting coaxial driven shaft, said driving shaft including a pinion adjacent its end adjacent said driven shaft, first and second carriers rotatably mounted on said driving shaft on opposite sides of said pinion, said first carrier being positioned between said pinion and said end of said driving shaft adjacent said driven shaft and having a hub extending away from said pinion and a pinion formed on said hub, a first idler gear rotatably mounted on said first and second carriers and meshing with said driving shaft pinion, a brake adjustable to engage said second carrier, a third carrier positioned between said first carrier and said end of said driving shaft adjacent said driven shaft and rotatable on said driving shaft, a pin rotatable in and carried by said third carrier, second and third idler gears secured on said pin, said second idler gear meshing with said first carrier pinion, a pinion secured to said driven shaft and meshing with said third idler gear, a cage member enclosing said first and third carriers and having an internally-toothed gear meshing with said first idler gear, an over-running clutch between said cage member and said third carrier, and a pressure plate type clutch having inner and outer friction discs adjustably engageable under the control of a biasing spring and a control handle, said outer friction discs being restrained from rotation relative to said cage member and said inner friction discs being restrained from rotation relative to said driven shaft.

8. A transmission unit with feed-back to vary the gear ratio comprising a housing, a driving shaft and an abutting coaxial driven shaft journaled respectively in opposite ends of said housing, said driving shaft including a pinion adjacent its end adjacent said driven shaft, first and second carriers rotatably mounted on said driving shaft on opposite sides of said pinion, said first carrier being positioned between said pinion and said end of said driving shaft adjacent said driven shaft and having a hub extending away from said pinion and a pinion formed on said hub, a first idler gear rotatably mounted on said first and second carriers and meshing with said driving shaft pinion, a brake adjustable to engage said second carrier, a third carrier positioned between said first carrier and said end of said driving shaft adjacent said driven shaft and rotatable on said driving shaft, a pin rotatable in and carried by said third carrier, second and third idler gears secured on said pin, said second idler gear meshing with said first carrier pinion, a pinion secured to said driven shaft and meshing with said third idler gear, a first cage member enclosing said first and third carriers and having at one end an internally-toothed gear meshing with said first idler gear and rotatably mounted at its other end on said driven shaft, an over-running clutch between said first cage member and said third carrier, a pinion secured on said other end of said first cage member, a corresponding abutting pinion secured to said driven shaft, a second cage member enclosing said two last-mentioned pinions, an idler gear rotatably mounted in said second cage member and meshing with both said two last-mentioned pinions, and a pressure plate type clutch having inner and outer friction discs adjustably engageable under the control of a biasing spring and a control handle, said outer friction discs being restrained from rotation relative to said second cage member and said inner friction discs being restrained from rotation relative to said housing.

9. A transmission unit with feed-back to vary the gear ratio comprising a driving shaft and an abutting coaxial driven shaft, said driving shaft including a pinion adjacent its end adjacent said driven shaft, first and second carriers rotatably mounted on said driving shaft on opposite sides of said pinion, said first carrier being positioned between said pinion and said end of said driving shaft adjacent said driven shaft and having a hub extending away from said pinion and a pinion formed on said hub, a first idler gear rotatably mounted on said first and second carriers and meshing with said driving shaft pinion, a brake adjustable to engage said second carrier, a third carrier positioned between said first carrier and said end of said driving shaft adjacent said driven shaft and rotatable on said driving shaft, a pin rotatable in and carried by said third carrier, second and third idler gears secured on said pin, said second idler gear meshing with said first carrier pinion, a pinion secured to said driven shaft and meshing with said third idler gear, a cage member having at one end an internally-toothed gear meshing with said idler gear and rotatably mounted at its other end on said driven shaft, an over-running clutch between said cage member and said third carrier, a cam secured to said other end of said cage member, and a hydraulic radial plunger pump including a pump housing mounted on and secured to said driven shaft and having a plurality of spring-biased radial plungers disposed in corresponding respective cylinders and operable to compress their corresponding springs due to the camming action of said cam, a suction chamber common to each radial cylinder and a discharge chamber common to each radial cylinder, a check valve between each chamber and each cylinder, and a control valve between said chambers, whereby said radial pump acts as a hydraulic abutment and adjustable restraining clutch member between said cage member and said driven shaft under control of said control valve to control the action of said cage member in varying the gear ratio of the transmission unit as the speed of said driven shaft varies.

10. A transmission unit with feed-back to vary the gear ratio comprising a housing, a driving shaft and an abutting coaxial driven shaft journaled respectively in opposite ends of said housing, said driving shaft including a pinion adjacent its end adjacent said driven shaft, first and second carriers rotatably mounted on said driving shaft on opposite sides of said pinion, said first carrier being positioned between said pinion and said end of said driving shaft adjacent said driven shaft and having a hub extending away from said pinion and a pinion formed on said hub, a first idler gear rotatably mounted on said first and second carriers and meshing with said driving shaft pinion, a brake adjustable to engage said second carrier, a third carrier positioned between said first carrier and said end of said driving shaft adjacent said driven shaft and rotatable on said driving shaft, a pin rotatable in and carried by said third carrier, second and third idler gears secured on said pin, said second idler gear meshing with said first carrier pinion, a pinion secured to said driven shaft and meshing with said third idler gear, a first cage member having at one end an internally-toothed gear meshing with said first idler gear and rotatably mounted at its other end on said driven shaft, an over-running clutch between said first cage member and said third carrier, a pinion secured on said other end of said first cage member, a corresponding abutting pinion secured to said driven shaft, a second cage member enclosing said two last-mentioned pinions, an idler gear rotatably mounted in said second cage member and meshing with both said two last-mentioned pinions, a cam secured to said second cage member and rotatable on said driven shaft, and a hydraulic radial plunger pump including a pump housing rotatably mounted on said driven shaft and secured to said first-mentioned housing and having a plurality of spring-biased radial plungers disposed in corresponding respective cylinders and operable to compress their corresponding springs due to the camming action of said cam, a suction chamber common to each radial cylinder and a discharge chamber common to each radial cylinder, a check valve between each chamber and each cylinder, and a control valve between said chambers, whereby said radial pump acts as a hydraulic abutment and adjustable restraining clutch member between said second cage member and said first-mentioned housing under control of said control valve to control the action of said cage members in varying the gear ratio of the transmission unit as the speed of said driven shaft varies.

JOHN T. WELSH.

(References on following page)

REFERENCES CITED

The following references are of record in the file of this patent:

UNITED STATES PATENTS

| Number | Name | Date |
|---|---|---|
| 986,588 | O'Kelly | Mar. 14, 1911 |
| 1,204,379 | Tuttle | Nov. 7, 1916 |
| 1,264,561 | Riker | Apr. 30, 1918 |
| 2,292,079 | Joyce | Aug. 4, 1942 |
| 2,364,448 | Jandasek | Dec. 5, 1944 |
| 2,472,559 | Arnold | June 7, 1949 |

FOREIGN PATENTS

| Number | Country | Date |
|---|---|---|
| 614,340 | France | Dec. 11, 1926 |
| 856,446 | France | June 13, 1940 |
| 905,503 | France | Dec. 6, 1945 |